(12) United States Patent
Di Gioia

(10) Patent No.: US 12,345,609 B2
(45) Date of Patent: Jul. 1, 2025

(54) DETECTING FUGITIVE EMISSIONS WITH A VALVE POSITIONER

(71) Applicant: Dresser, LLC, Houston, TX (US)

(72) Inventor: Pasquale Di Gioia, Torre del Greco (IT)

(73) Assignee: Dresser, LLC, Houston, TX (US)

( * ) Notice: Subject to any disclaimer, the term of this patent is extended or adjusted under 35 U.S.C. 154(b) by 0 days.

(21) Appl. No.: 18/070,714

(22) Filed: Nov. 29, 2022

(65) Prior Publication Data
US 2024/0175776 A1    May 30, 2024

(51) Int. Cl.
   *G01M 3/04*    (2006.01)
   *F16K 37/00*   (2006.01)
   *F16K 41/04*   (2006.01)

(52) U.S. Cl.
   CPC ........... *G01M 3/04* (2013.01); *F16K 37/0075* (2013.01); *F16K 41/04* (2013.01)

(58) Field of Classification Search
   None
   See application file for complete search history.

(56) References Cited

U.S. PATENT DOCUMENTS

| | | | |
|---|---|---|---|
| 4,901,751 A | 2/1990 | Story et al. | |
| 5,020,773 A | 6/1991 | Tuft et al. | |
| 5,439,021 A * | 8/1995 | Burlage | G05D 16/20 137/84 |
| 5,549,137 A * | 8/1996 | Lenz | G05D 7/005 137/86 |
| 5,558,115 A * | 9/1996 | Lenz | F16K 31/1262 137/86 |
| 6,795,324 B2 | 9/2004 | Dilger et al. | |
| 9,304,053 B2 | 4/2016 | Smart et al. | |
| 9,915,375 B1 * | 3/2018 | Anderson | G05B 23/0235 |
| 2014/0261791 A1 * | 9/2014 | Grabau | F16K 37/0075 137/551 |
| 2015/0041000 A1 * | 2/2015 | Smart | G01M 3/184 73/40 |
| 2019/0078965 A1 | 3/2019 | Vegetti | |

* cited by examiner

*Primary Examiner* — Angelisa L. Hicks
(74) *Attorney, Agent, or Firm* — Paul Frank + Collins P.C.

(57) ABSTRACT

A valve positioner that is configured to detect fugitive emissions on a valve. The configuration may include a sensor that resides in proximity to the device. The sensor may connect to a control unit, preferably with operating hardware that can process signals. This arrangement may secure to structure of the valve. In one implementation, the sensor can connect to connections that exist on a circuit board. This feature permits upgrades to devices, including those in assembly or those in the field, with minimal impact to design or performance.

18 Claims, 5 Drawing Sheets

DETECTING FUGITIVE EMISSIONS WITH A VALVE POSITIONER

BACKGROUND

Flow controls play a significant role in many industrial settings. Power plants and industrial process facilities, for example, use different types of flow controls to manage flow of material, typically fluids, throughout vast networks of pipes, tanks, generators, and other equipment. In some applications, like those that transport hydrocarbons or fossil fuels, performance of the flow control is subject to significant regulation or operating parameters to satisfy contractor, purchasers, or end users, including allowable amounts of emissions that may emanate from the device.

SUMMARY

The subject matter of this disclosure relates to improvements to address emissions in or around devices on a process line. Of particular interest are embodiments that are sensitive to "fugitive" emissions. The embodiments can detect very small amounts of fluids that can emanate from in or around components on flow controls, typically valves. This feature can reduce costs and improve safety because it forecloses the need for "manual" examination of these devices that often require technicians to approach individual valves with hand-held equipment. One benefit of the proposed approach is to reduce costs of labor because of operators can extend regular maintenance cycles in lieu of alerts (or other indicators) to problems on their devices. Another benefit is that it takes advantage of existing communication infrastructure at an operator's facility. This feature can allow data, like measurements of fugitive emissions, to exchange with a central control network to further analysis and diagnostics.

DRAWINGS

This specification refers to the following drawings.

Figure 1:
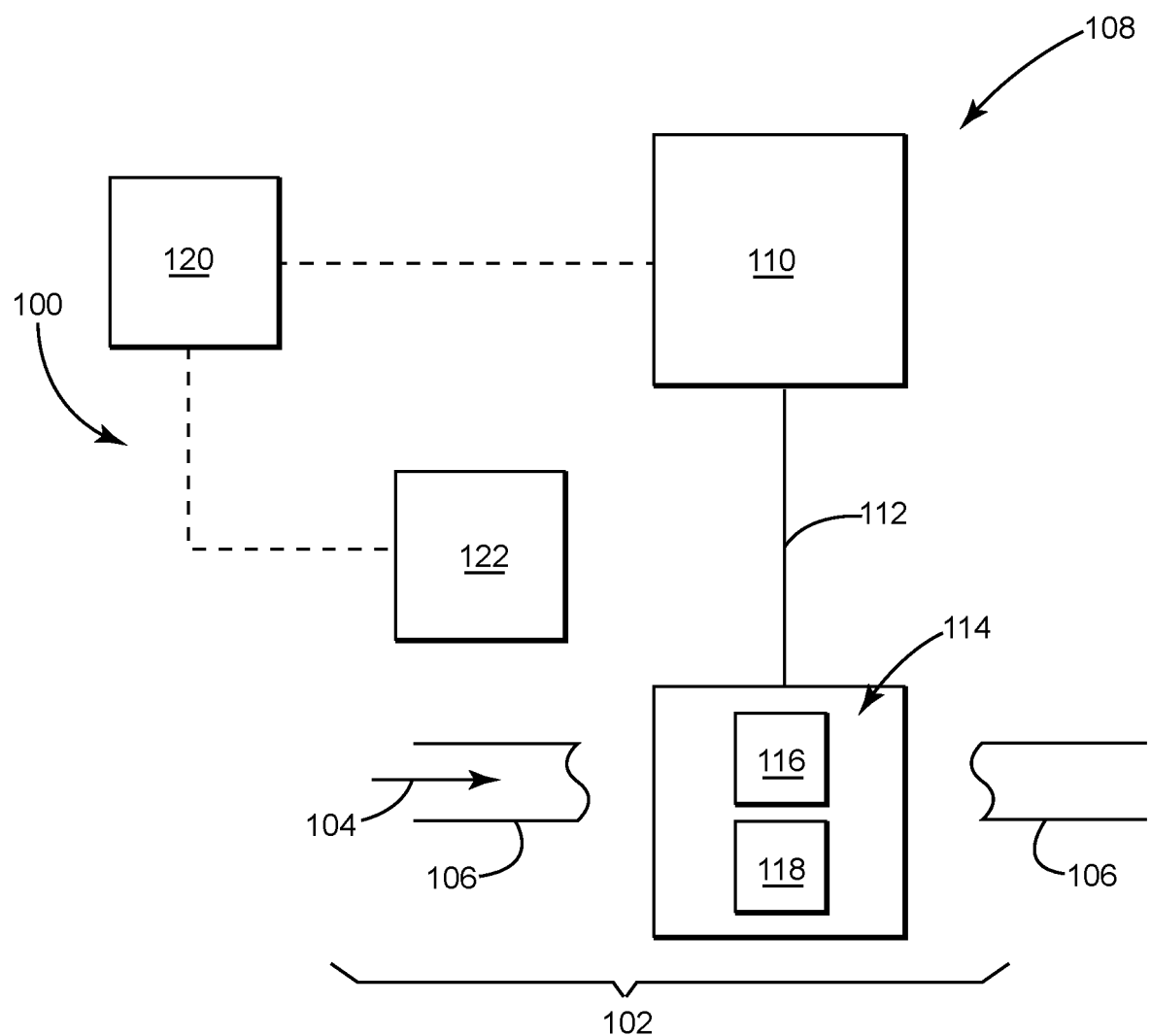
FIG. 1 depicts a schematic diagram of an exemplary embodiment of a valve positioner.

These drawings and any description herein represent examples that may disclose or explain the invention. The examples include the best mode and enable any person skilled in the art to practice the invention, including making and using any devices or systems and performing any incorporated methods. The drawings are not to scale unless the discussion indicates otherwise. Elements in the examples may appear in one or more of the several views or in combinations of the several views. The drawings may use like reference characters to designate identical or corresponding elements. Methods are exemplary only and may be modified by, for example, reordering, adding, removing, and/or altering individual steps or stages. The specification may identify such stages, as well as any parts, components, elements, or functions, in the singular with the word "a" or "an;" however, this should not exclude plural of any such designation, unless the specification explicitly recites or explains such exclusion. Likewise, any references to "one embodiment" or "one implementation" should does not exclude the existence of additional embodiments or implementations that also incorporate the recited features.

DESCRIPTION

The discussion now turns to describe features of the examples shown in drawings noted above. These features address leaks or release of fluids that may occur on process lines. Often, the release is at such small quantities that it is difficult to detect or to provide accurate measure. The leak, though, can manifest over time to account for much greater volumes that exceed standards or specifications. As noted herein, the proposed design may address operator concerns about these "fugitive" emissions on their process lines. The designs also propose a cost-effective solution that can leverage existing computing hardware to give operators pre-emptive notice of fugitive gasses (or other fluids) that may percolate or escape from process devices. Other embodiments are within the scope of this disclosure.

FIG. 1 depicts a schematic diagram of an exemplary valve positioner 100. This example is found in a distribution network 102, typically designed to carry material 104 through a network of conduit 106. The network 102 may include a flow control 108 that is part of the network 102. The flow control 108 may have an actuator 110 and a valve stem or shaft 112 with an end that couples with valve mechanics 114, which may include a closure member 116 and a seat 118. In one implementation, the valve positioner 100 may include a control unit 120 that couples with a sensor unit 122.

Broadly, the valve positioner 100 may be configured to perform analysis or diagnostics. These configurations may embody devices that can alert operators to problems on their process lines. These devices might detect fugitive emissions that arise in proximity to process devices found in industrial settings. This feature can alert operators to release of harmful fluids, like chlorine gas. The feature can also reduce greenhouse gas emission in hydrocarbon plants because the device can alert operators to slow leaks that occur in valves or like process devices. The operators can then perform pre-emptive maintenance to fix issues that would avoid any protracted emissions from the device.

The distribution system 102 may be configured to deliver or move these fluids. These configurations may embody vast infrastructure. Material 104 may comprise gases, liquids, solid-liquid mixes, or liquid-gas mixes, as well. The conduit 106 may include pipes or pipelines, often that connect to pumps, boilers, and the like. The pipes may also connect to tanks or reservoirs. In many facilities, this equipment forms complex networks to execute a process, like refining raw materials or manufacturing an end product.

The flow control 108 may be configured to regulate flow of material 104 through the conduit 106 in these complex networks. These configurations may include control valves and like devices. The actuator 110 may use pressurized fluid (like air or natural gas) to generate a load. Often, the device may include a piston, spring (or springs), or a flexible diaphragm for this purpose. The valve stem 112 may direct this load to the closure member 116, typically a ball, a plug, or a disc. The load may counter pressure of material 104 on an opposite side of the closure member 116. This feature can maintain the closure member 116 in a desired position relative to the seat 118. In one implementation, the desired position or "set point" may correspond with flow parameters for the material 104 to meet process requirements or parameters.

The control unit 120 may be configured to process and generate signals. These configurations may connect to a control network (or "distributed control system" or "DCS"), which maintains operation of all devices on process lines to ensure that materials flow in accordance with a process. The DCS may generate control signals with operating parameters that describe or define operation of the flow control 108 for this purpose. The control unit 120 may have operating hardware, like electrical and computing components (e.g., processors, memory, executable instructions, etc.). These components may also include electro-pneumatic devices that operate on incoming pneumatic supply signal. These components ensure that the outgoing actuator control signal to the actuator 112 is appropriate for the flow control 108 to supply material 104 downstream according to process parameters.

The sensor unit 122 may be configured to detect fugitive emissions. These configurations may include devices that are sensitive to various fluids, often in limited or finite amounts or quantities. The device(s) may embody various types of detection technology, including LIDAR, infrared, optical, chemical, and the like. Technology may prevail to accommodate distance or spacing between the device and the source of emissions, for example, packing material that is found on the flow control 108. This technology may generate a signal that quantifies the amount or, for example, presence or absence of the fluid(s) in vicinity of the device. This signal may transit to the control unit 120. Operating hardware may be configured with software (or like executable instructions) to process the signals as part of its analysis or diagnostics processes.

Figure 2:
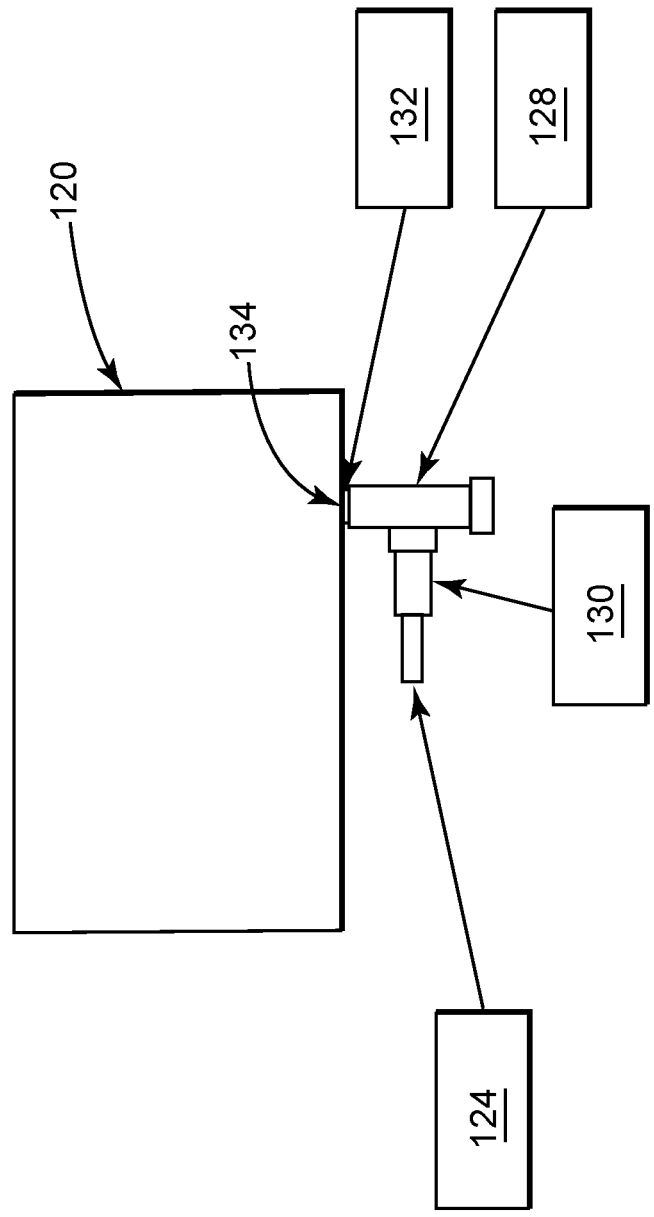
FIG. 2 depicts a schematic diagram of the controller of FIG. 1.

FIG. 2 depicts an elevation view of an example of structure for the controller 100 of FIG. 1. The sensor unit 122 may include a sensor 124 that is sensitive to emissions of various kinds. In one implementation, an interface 126 may serve to connect the sensor unit 124 onto the control unit 120. The interface 126 may have electrical conduit 128 having an end 130 to receive the sensor 124. Another end 132 may couple with a connection 134 on the control unit 120. The ends 130, 132 may have suitable threads or like adapters to secure in place in their desired locations. The conduit 128 itself may accept or receive wiring necessary to connect the sensor 124 with electronics of the control unit 120. This disclosure does contemplate use of wireless technology (like Bluetooth®) for this purpose as well.

Figure 3:
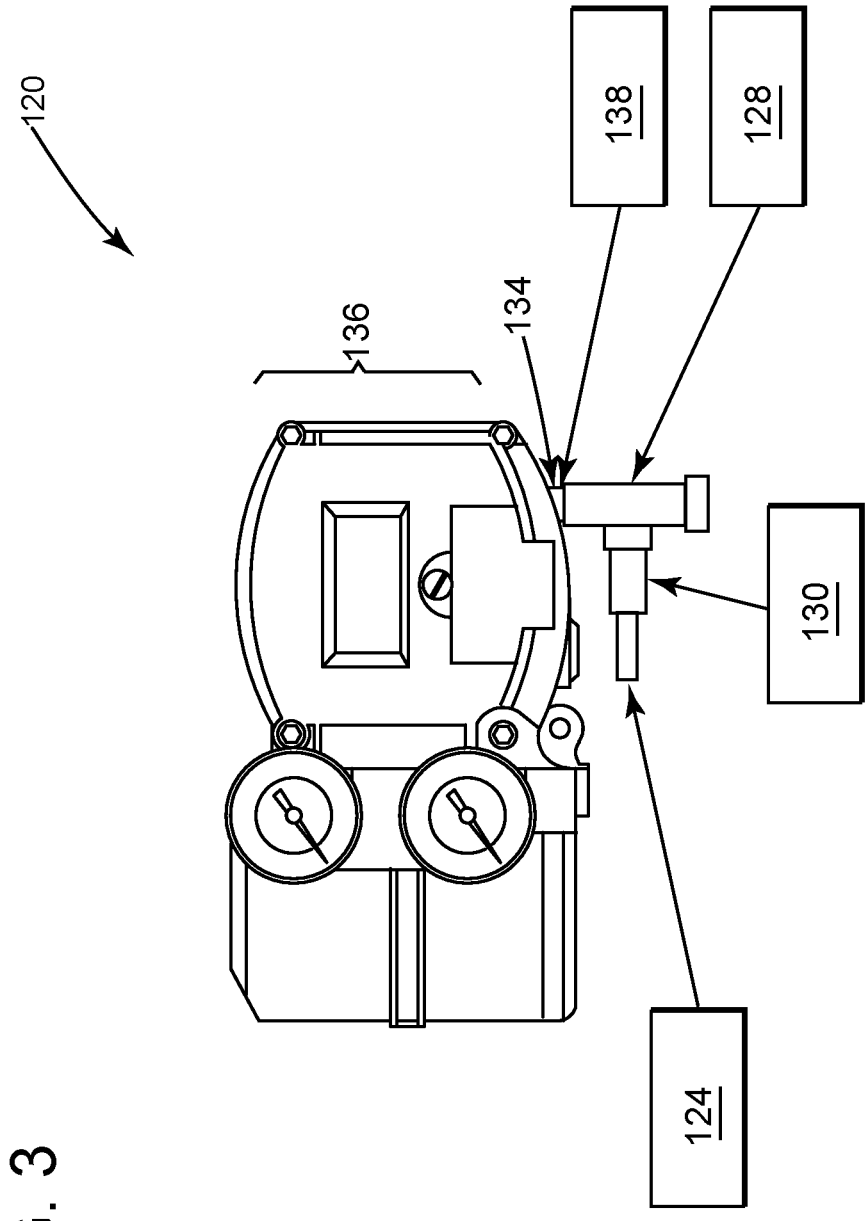
FIG. 3 depicts an elevation view of an example of the controller of FIG. 1.
Figure 4:
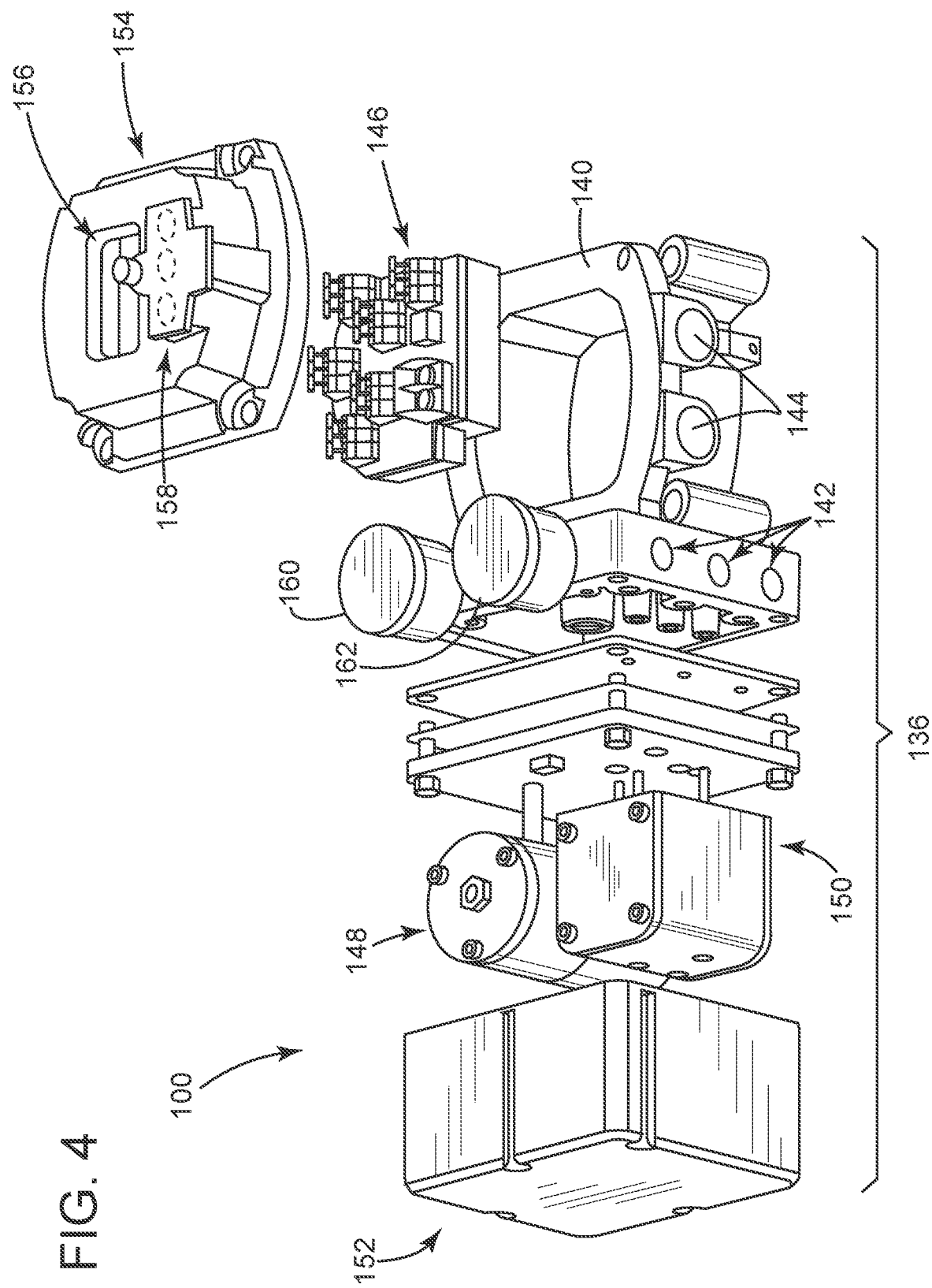
FIG. 4 depicts perspective view of an example of the controller of FIG. 1.

FIGS. 3 and 4 depict views of an example of structure for the control unit 120. The connection 134 may form part of an enclosure 136 that encloses and protects various parts, including electronic or electro-pneumatic components of the device. The enclosure 136 may include a manifold 138 having a manifold body 140, typically machined or formed metal, plastic or composite. The manifold body 140 may include openings 142 for ingress or egress of fluid, typically "instrument air" in the form of compressed air or sometimes pressurized natural gas (or, more generally, material 104). Threaded openings 144 may receive electrical connections, for example, threaded conduit like that found on the end 132 of the conduit 128. These openings 144 may provide access to control components found on circuit board 146. These components work in conjunction with a current-to-pressure converter 148 and a relay 150 to operate the flow control 108. A cover 152 may couple with the manifold body 140 to enclosure the electro-pneumatic components 148, 150. Another cover 154 may enclose and protect the circuit board 146. The cover 154 may incorporate a display 156 and a pushbutton input device 158 that operate as a primary local user interface to allow an end user to interact with the controller 100. In one implementation, gauges 160, 162 may provide an indication of the flow conditions, like pressure or flow rate, of the instrument air that the valve positioner 100 uses to operate the valve 106 in the valve assembly 102.

Figure 5:
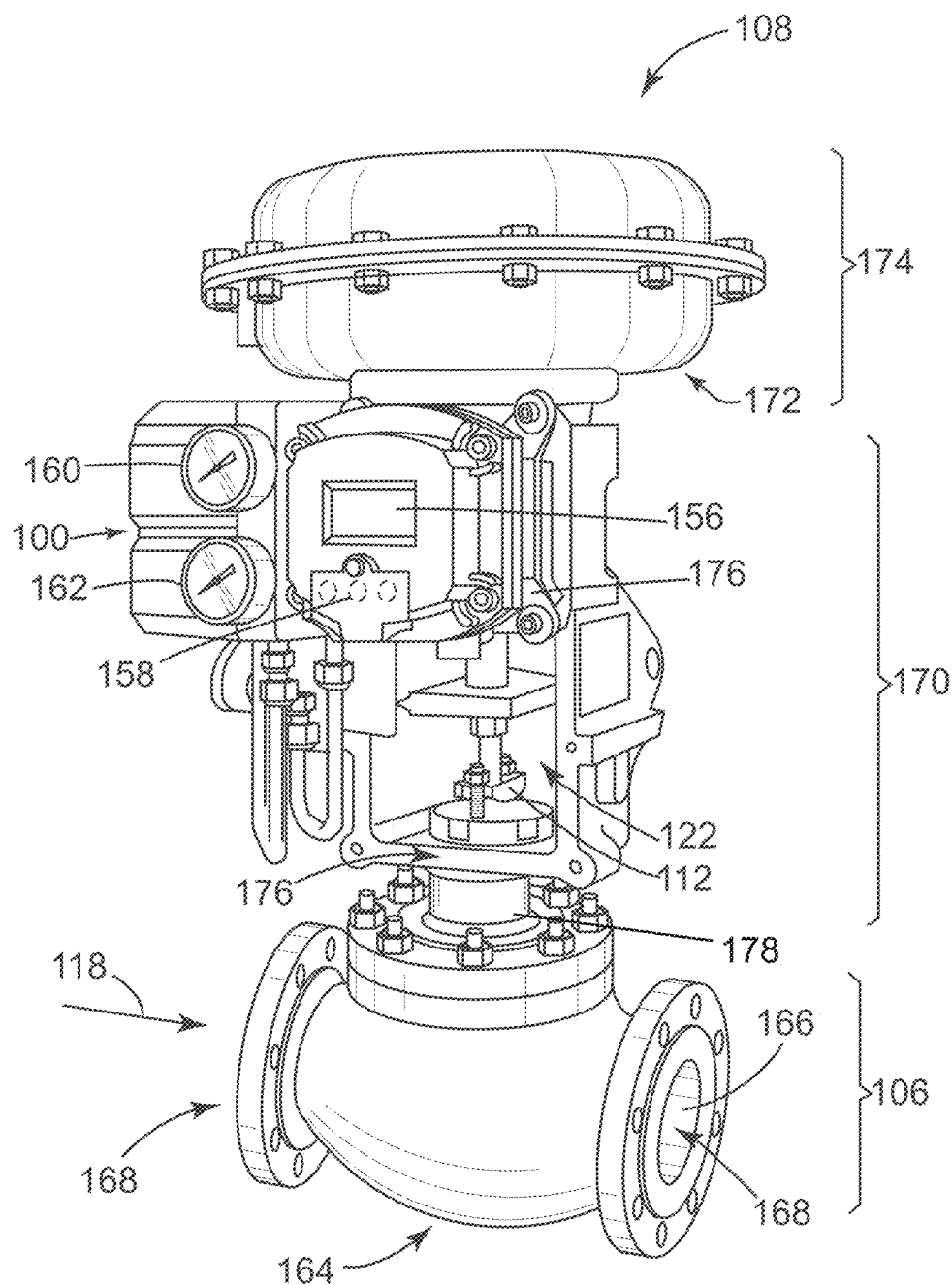
FIG. 5 depicts a perspective view of an example of a flow control.

FIG. 5 depicts a perspective view of exemplary structure for the flow control 108. This example reflects structure of a typical glove control valve; however, the disclosure contemplates use of the proposed design in any industrial valve device, including rotary valves like ball valves, butterfly valves, or globe valves. As shown, the valve body 110 may include a fluid coupling 164 that forms a flow path 166 with flanged, open ends 168. The fluid coupling may enclose the valve mechanics 114 (and, thus, they are hidden in the present view). This structure may be useful to regulate process fluids in industrial process lines typical of industries that focus on chemical production, refining production, and resource extraction. A superstructure 170 may secure to the fluid coupling 164. The superstructure 170 may support a pneumatic actuator 172, shown here to have a bulbous housing 174 that is typically two pieces that clamp about the edges to entrap a diaphragm (not shown) round the periphery. The control unit 120 may mount onto a bracket 176 that itself either secures to or incorporates as part of the superstructure 170. This arrangement can locate the sensor unit 122 in proximity to the fluid coupling 164, which may ultimate emit fugitive gasses, for example, from packing 178 that resides in the valve body 110. The packing 178 may surrounds the valve stem 112. As also shown, the control unit 120 can deliver instrument air at appropriate pressure to the pneumatic actuator 172, which utilizes the pressurized fluid to generate a load. Often, the device may include a piston, spring (or springs), or a flexible diaphragm for this purpose. The load may counter pressure of material 104 on an opposite side of the closure member 116 to maintain the closure member 116 in a desired position relative to the seat 118. This desired position or "set point" may correspond with flow parameters for the material 104 to meet process requirements or parameters.

The examples below include certain elements or clauses to describe embodiments contemplated within the scope of this specification. These elements may be combined with other elements and clauses to also describe embodiments. This specification may include and contemplate other examples that occur to those skilled in the art. These other examples fall within the scope of the claims, for example, if they have structural elements that do not differ from the literal language of the claims, or if they include equivalent structural elements with insubstantial differences from the literal language of the claims.

What is claimed is:

1. A valve, comprising:
    an actuator;
    a valve positioner coupled with the actuator, the valve positioner having operating hardware that generates a pneumatic signal to the actuator, the valve position comprising an enclosure formed to enclose the operating hardware, the enclosure comprising a threaded connection disposed therein;
    an electrical conduit having a body comprising a first portion and a second portion, the second portion coupled to the first portion at an angle, the first portion comprising a threaded end coupled to the threaded connection; and
    a sensor unit comprising a sensor having one end disposed on the second portion of the body, the sensor coupled to the operating hardware through wiring found in the electrical conduit, the sensor unit responsive to fugitive emissions; and a valve body with packing material disposed therein, wherein the sensor is spaced apart from both the valve body and the packing material, and wherein the sensor is configured to detect emissions without means to contain or direct emissions from the packing material to the sensor.

2. The valve of claim 1, wherein the sensor unit resides in proximity to the valve body.

3. The valve of claim 1, wherein the sensor unit is sensitive to emissions of gas that originates from inside of the valve body.

4. The valve of claim 1, further comprising:
a valve stem coupled to the actuator,
wherein the sensor unit resides in proximity to the valve stem.

5. The valve of claim 1, wherein the sensor unit comprises a wiring harness that extends into the valve positioner.

6. The valve of claim 1, wherein the second portion of the body is perpendicular to the first portion of the body.

7. A valve, comprising:
a valve positioner comprising operating hardware that generates a pneumatic signal and a housing enclosing the operating hardware, the housing having an opening for access to the operating hardware;
an electrical conduit connected to the opening, the electrical conduit having a body comprising a first portion and a second portion, the second portion coupled to the first portion at an angle, the first portion comprising a threaded end coupled to the threaded connection;
a wiring harness extending through the electrical conduit and connecting with the operating hardware;
a sensor disposed on the second portion of the t-shaped body and coupled with the wiring harness; and
a valve body with packing material disposed therein,
wherein the sensor is spaced apart from both the valve body and the packing material, and
wherein the sensor is configured to detect emissions without means to contain or direct emissions from the packing material to the sensor.

8. The valve of claim 7, wherein the sensor is sensitive to natural gas.

9. The valve of claim 7, further comprising:
a superstructure coupled with the valve body,
wherein the valve positioner resides on the superstructure, and
wherein the electrical conduit extends away from the valve positioner to locate the sensor in proximity to the valve body.

10. The valve of claim 7, further comprising:
a superstructure coupled with the valve body, an actuator disposed on the superstructure, and a valve stem coupled with the actuator and extending into the valve body,
wherein the valve positioner resides on the superstructure, and
wherein the electrical conduit extends away from the valve positioner to locate the sensor in proximity to valve stem.

11. The valve of claim 7, further comprising:
a superstructure coupled with the valve body, an actuator disposed on the superstructure, a valve stem coupled with the actuator and extending into the valve body, the packing material surrounding the valve stem,
wherein the valve positioner resides on the superstructure, and
wherein the electrical conduit extends away from the valve positioner to locate the sensor in proximity to the packing material.

12. The valve of claim 7, wherein the electrical conduit comprises a part that is flexible.

13. The valve of claim 7, wherein the electrical conduit comprises a part that is threaded to connect with the opening on the housing.

14. A valve, comprising:
an actuator;
a valve stem coupled with the actuator;
a valve body with an opening to receive the valve stem and packing materials surrounding the valve stem;
a sensor disposed in proximity to the opening;
a wiring harness coupled with the sensor; and
a valve positioner with a housing that is configured to receive the wiring harness inside; and
an electrical conduit having a body comprising a first portion and a second portion, the second portion coupled to the first portion at an angle, the first portion comprising a threaded end coupled to housing,
wherein the sensor is disposed on the second portion of the t-shaped body, which is configured to maintain the sensor in its position proximate the opening,
wherein the wiring harness extends through the electrical conduit, and
wherein the sensor is spaced apart from both the valve body and the packing material, and
wherein the sensor is configured to detect emissions without means to contain or direct emissions from the packing material to the sensor.

15. The valve of claim 14, wherein the valve positioner has operating hardware inside of the housing that processes signals from the sensor.

16. The valve of claim 14, wherein the valve positioner has operating hardware inside of the housing that transmits data to a location remote from said valve, including data that relates to signals from the sensor.

17. The valve of claim 14, wherein the valve positioner has operating hardware inside of the housing that exchanges data with a control system, including data that relates to signals from the sensor.

18. The valve of claim 14, wherein the valve positioner has operating hardware inside of the housing that generates a pneumatic signal to the actuator.

* * * * *